United States Patent
Shibata et al.

(10) Patent No.: US 9,221,389 B2
(45) Date of Patent: Dec. 29, 2015

(54) VEHICLE LAMP

(71) Applicant: KOITO MANUFACTURING CO., LTD., Tokyo (JP)

(72) Inventors: Hiroki Shibata, Shizuoka (JP); Shoichiro Yokoi, Shizuoka (JP); Tomokazu Suzuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 175 days.

(21) Appl. No.: 13/933,570

(22) Filed: Jul. 2, 2013

(65) Prior Publication Data

US 2014/0015410 A1   Jan. 16, 2014

(30) Foreign Application Priority Data

Jul. 10, 2012 (JP) ................................. 2012-154269
Nov. 8, 2012 (JP) ................................. 2012-246304

(51) Int. Cl.
*B60Q 1/14* (2006.01)
*H05B 33/08* (2006.01)
*F21S 8/10* (2006.01)

(52) U.S. Cl.
CPC ........... *B60Q 1/1407* (2013.01); *F21S 48/1159* (2013.01); *F21S 48/145* (2013.01); *F21S 48/1778* (2013.01); *H05B 33/0803* (2013.01); *H05B 33/0842* (2013.01); *H05B 33/0845* (2013.01)

(58) Field of Classification Search
CPC .................................................... B60Q 1/1407
USPC ........ 315/82, 77, 307; 362/558, 607, 26, 271, 362/278
See application file for complete search history.

(56) References Cited

U.S. PATENT DOCUMENTS 7,600,903 B2   10/2009   Mensales et al.
7,815,352 B2 *  10/2010   Naganawa et al. ........... 362/523
8,419,251 B2 *   4/2013   Kinoshita ..................... 362/558
(Continued)

FOREIGN PATENT DOCUMENTS

CN   102313238 A   1/2012
EP     0982189 A2   3/2000
(Continued)

OTHER PUBLICATIONS

Extended European Search Report dated Nov. 4, 2013, issued by the European Patent Office in corresponding European Application No. 13175911.0.
(Continued)

*Primary Examiner* — Dinh Le
(74) *Attorney, Agent, or Firm* — Sughrue Mion, PLLC

(57) ABSTRACT

A vehicle lamp includes a light source (LED) 2, a solenoid-type actuator 6, and a lamp control device LC. The light source 2 lights up when a current flows therethrough. The actuator 6 controls a light distribution of light that is illuminated from the light source 2. The lamp control device LC controls lighting-up of the light source 2 and driving of the actuator 6. The lamp control device LC includes a current control device 10 and an actuator control device 20. The current control device 10 outputs a constant current. The actuator control device 20 connects the actuator 6 to the light source 2 in series based on a predetermined signal so that the constant current, which is output from the current control device 10, flows through the light source 2 and the actuator 6.

10 Claims, 14 Drawing Sheets

(56) References Cited

U.S. PATENT DOCUMENTS

2008/0112180 A1     5/2008    Okada
2008/0298077 A1    12/2008    Naganawa et al.

FOREIGN PATENT DOCUMENTS

| JP | 2004214144 A | 7/2004 |
|---|---|---|
| JP | 2004-342615 A | 12/2004 |
| JP | 2007-213938 A | 8/2007 |
| JP | 2009-283839 A | 12/2009 |
| JP | 2011-151504 A | 8/2011 |

OTHER PUBLICATIONS

Communication dated Apr. 22, 2015, issued by the Patent Office of the People's Republic of China in counterpart Chinese Patent Application No. 201310235138.5.

* cited by examiner

//VEHICLE LAMP

CROSS REFERENCE TO RELATED APPLICATION(S)

This application is based on and claims priority under 35 U.S.C. §119 to Japanese Patent Application Nos. 2012-246304 (filed on Nov. 8, 2012) and 2012-154269 (filed on Jul. 10, 2012), the entire contents of which are incorporated herein by reference.

BACKGROUND

The invention relates to a vehicle lamp capable of switching light distribution, and more particularly, to a vehicle lamp having a solenoid-type actuator for switching the light distribution.

One lamp for use as a vehicle lamp is configured such that a variable shade is disposed in the lamp to switch light distribution and the variable shade is driven to switch an area where light emitted from a light source is shielded. Also, an actuator having a motor as a driving source and an actuator having a solenoid as a driving source have been proposed as an actuator for driving the variable shade. JP 2004-342615 A (corresponding to U.S. Pat. No. 7,600,903) describes an example of the former one. JP 2007-213938 A describes an example of the latter one. Pros and cons of these actuators are described below. For example, the motor-type actuator can be configured to be small in size even if a driving force required to drive the variable shade is obtained. However, a current change that is caused when the motor is rotated or stopped generates electromagnetic wave noises, and the thus-generated electromagnetic wave noises might cause malfunction of an electronic device (particularly, an electronic control unit) mounted on a vehicle. On the other hand, the solenoid-type actuator does not generate such electromagnetic wave noises. However, in order to obtain the driving force required to drive the variable shade, it is necessary to increase a diameter and/or a shaft length of a coil making up the actuator or to increase the number of turns in the coil. As a result, the solenoid-type actuator becomes large as compared with the motor-type actuator.

SUMMARY

An earlier Japanese patent application No. 2012-101933 filed by the applicant (it should be noted that the Japanese '933 application was not published prior to filing of this application) suggested a technology that provides a novel current control device as a lamp control device for driving a solenoid-type actuator (hereinafter, which may be simply referred to as an "actuator") and that suppresses a current flowing through the actuator while securing a driving force required by the actuator to thereby achieve side reduction of the actuator. Also, at the same time, the current control device is rendered to function as a lighting control device for controlling lighting of a light source of the lamp. Thereby, compared to a case where the current control device and the lighting control device are provided individually, it is possible to reduce an arrangement space (where the current control device and the lighting control device are disposed) in the lamp so that the lamp is made compact.

In order to render the current control device to function as the lighting control device, in the technology of the earlier application, the light source and the actuator are connected in parallel to a current output terminal of the current control device, and a part of a circuit is provided with a switching circuit (hereinafter which may be referred to as a "current switching circuit") that changes/controls a current amount when the light source is turned on and a current amount when the actuator is driven simultaneously. The current switching circuit increases an output current to thereby drive the actuator. The inventors found that there is a room that the current control device of the Japanese '933 application is further improved in order to deal with the following matter.

That is, when the light source is configured of a light emitting device such as LED, variability of Vf (diode forward voltage) tends to occur due to individual difference in LEDs. The variability of Vf causes a consumption current of the LED to vary, which leads to variation of the current flowing through the actuator. As a result, the driving of the actuator is apt to be unstable. In order to ensure stable driving of the actuator, it is necessary to secure a margin enough to deal with the variation of the consumption current in the LED. Thus, it is necessary to design the output current to be increased by a current amount corresponding to the margin, which might be disadvantageous to save the power.

In view of the above circumstances, the invention provides a vehicle lamp in which a lighting control device is compatible with both of a lamp having an actuator and a lamp not having an actuator and an increase in power consumption when the actuator is driven is suppressed to achieve size reduction and power saving.

According to one embodiment, a vehicle lamp includes a light source, a solenoid-type actuator, and a lamp control device. The light source lights up when a current flows therethrough. The actuator controls a light distribution of light that is illuminated from the light source. The lamp control device controls lighting-up of the light source and driving of the actuator. The lamp control device includes a current control device and an actuator control device. The current control device outputs a constant current. The actuator control device connects the actuator to the light source in series based on a predetermined signal so that the constant current, which is output from the current control device, flows through the light source and the actuator.

The actuator control device may include a relay switch having a normally closed contact that is connected to the light source in series. When the predetermined signal is input, the relay switch releases the normally closed contact.

Alternatively, the actuator control device may include a switching circuit. When the predetermined signal is input, the switching circuit switches the actuator to a state where the actuator is connected to the light source in series.

Also, the current control device or the actuator control device may include a current reducing unit. The current reducing unit reduces the current flowing through the actuator after a predetermined time elapses since the constant current starts to flow through the actuator.

Alternatively, the vehicle lamp may further include a current increasing unit. The current increasing unit increases the current flowing through the actuator at a starting initial stage at which the constant current flows through the actuator.

The actuator control device may be provided independently of at least the current control device and the light source. In this case, the actuator control device may be integrated with the actuator.

Alternatively, the actuator control device may be integrated with at least one of the current control device and the light source.

With the above configuration, the actuator is connected with the light source in series and is driven by the constant current, which is output from the current control device. Therefore, when the light source is configured of an LED(s), it is possible to perform a stable driving without considering variation of Vf. A current margin can be reduced to thus save power during the driving of the actuator. Also, the above described improvement can be realized. Also, the actuator control device can cause the constant current, which is output from the current control device, to flow through the actuator. Therefore, a lamp having an actuator may be mounted with the actuator control device and the current control device while a lamp having no actuator may be mounted with the current control device. Thereby, it is possible to make the current control device compatible with these lamps.

DETAILED DESCRIPTION

Figure 1:
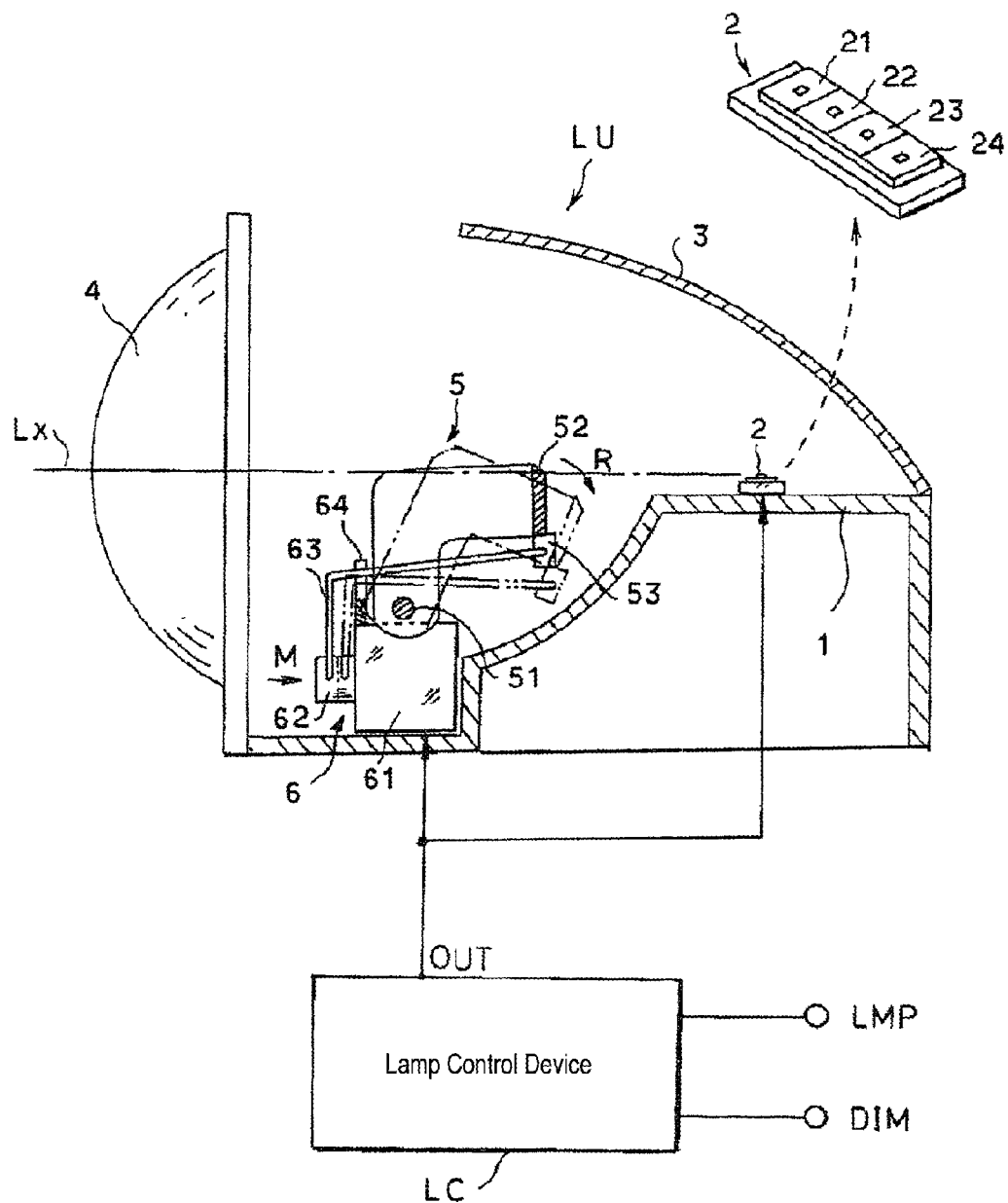
FIG. 1 is a schematic sectional configuration view of a lamp unit according to an embodiment of the invention.

Hereinafter, embodiments of the invention will be described with reference to the accompanying drawings. FIG. 1 is a schematic sectional configuration view of a lamp unit LU that is appropriately used for a head lamp of a vehicle. Although not shown, the lamp unit LU is configured as a projector-type lamp that is disposed in lamp housings which is provided on each of left and right sides of a front side part of a vehicle body. The lamp unit LU is connected with a lamp control device LC that controls a lighting state of the lamp unit LU and a light distribution of the lamp unit LU. Also, the lamp control device LC is connected with a lighting switch (lamp switch) LMP and a light distribution changeover switch (dimmer switch) DIM which are provided at a driver seat of the vehicle. The lamp switch LMP is manipulated to turn on or off the lamp unit LU. The dimmer switch DIM is manipulated to switch the lamp unit LU between a first light distribution and a second light distribution which have different light distribution patterns from each other. Here, it is assumed that the lamp unit LU is switched between a low beam light distribution that is the first light distribution and a high beam light distribution that is the second light distribution.

In the lamp unit LU, an LED 2 serving as a light source is mounted on a lamp base 1. The LED 2 is formed by integrating four LED chips 21 to 24 which are arranged on a plane as shown in an enlarged appearance view on an upper right portion of FIG. 1. The four LED chips 21 to 24 have anodes and cathodes connected in series and are configured to emit light by an output current that is output from the lamp control device LC. Also, the lamp base 1 is provided with a reflector 3 that is configured by a part of an ellipsoid of revolution and covers the LED 2. An illumination lens 4 is supported at a front end portion of the lamp base 1. Also, the lamp base 1 is provided with a variable shade 5 and an actuator 6 which are disposed between the reflector 3 and the illumination lens 4. The actuator 6 drives the variable shade 5.

In the lamp unit LU, the light that is emitted when the LED 2 emits the light is reflected forwards by the reflector 3, and the reflected light and/or light directly emitted from the LED 2 is illuminated towards the forward of the lamp unit LU by the illumination lens 4. Also, the variable shade 5 is driven by the actuator 6, to thereby shield a part of the light emitted from the LED 2 or control a flux of light which is incident onto the illumination lens 4 without shielding the flux of light. As a result, it is possible to switch the light distribution of the illuminated light between the first light distribution and the second light distribution.

Figure 2A:
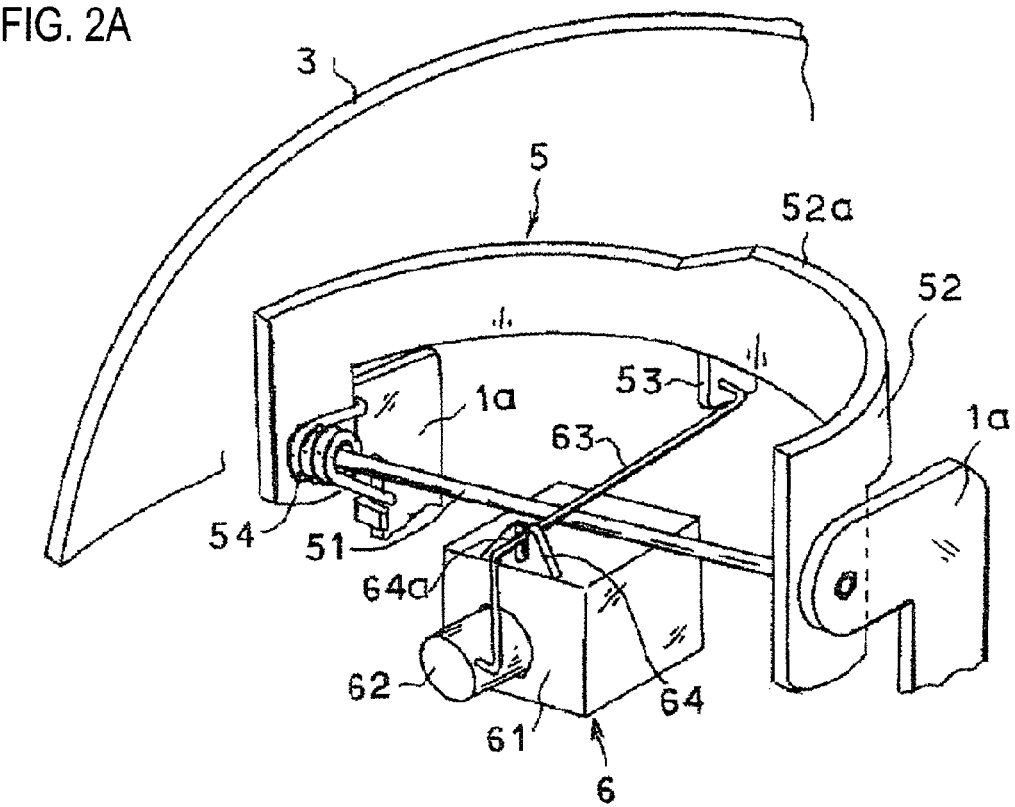
FIGS. 2A and 2B are schematic perspective views showing a variable shade and an actuator.

As shown in a schematic external view of FIG. 2A, the variable shade 5 has a tilting shaft 51 that extends along a right and left direction perpendicular to a lamp optical axis Lx and is supported at both ends thereof by support pieces 1a. The support pieces 1a are provided to stand at both sides of the lamp base 1. A shade member 52 is supported by the tilting shaft 51. The shade member 52 can be tilted in a vertical direction within a predetermined angle range about the tilting shaft 51. The shade member 52 has a plate shape that is curved so as to be convex towards the LED 2. The shade member 52 is supported at both right and left end portions thereof by the tilting shaft 51. The shade member 52 has an upper edge 52a having a shape corresponding to a cutoff line of the low beam light distribution pattern. Also, the shade member 52 is configured so that (i) the shade member 52 is normally brought in a standing state by a spring force of a return spring 54 which is formed of a coil spring and which is fitted to the tilting shaft 51, that is, the shade member 52 is normally urged so as to be in a state where the light distribution pattern of the low beam light distribution is formed as will be described later and (ii) when the shade member 52 is tilted rearwards, the shade member 52 forms the light distribution pattern of the high beam light distribution.

The actuator 6 is a small solenoid-type actuator that can deal with the size reduction of the lamp unit LU. The actuator 6 includes a casing 61 and a metallic armature 62. The casing 61 has a solenoid 60 (a coil; see FIG. 4) integrally mounted therein. The solenoid 60 forms a magnetic field when the solenoid 60 is energized. A leading end portion of the armature 62 protrudes from the casing 61. The armature 62 has a cylindrical rod shape. The armature 62 is configured so that (i) when the solenoid 60 is not energized, the leading end portion thereof protrudes from the casing 61 and (ii) when the solenoid 60 is energized, and a magnetic force is thus generated, the leading end portion thereof is suctioned and moved in an inner direction of the casing 61 by the magnetic force. Also, the leading end portion of the armature 62 is engaged with one end of a connection rod 63. The other end of the connection rod 63 extends rearwards and is then engaged with a connection piece 53 that is integrated with a part of a lower side of the shade member 52. An intermediate part, in a longitudinal direction, of the connection rod 63 is inserted into an upward U-shaped groove 64a that is formed in a guide piece 64 standing on a part of the casing 61. The connection rod 63 is guided and held so that the connection rod 63 moves in a direction along the lamp optical axis Lx.

Figure 3A:
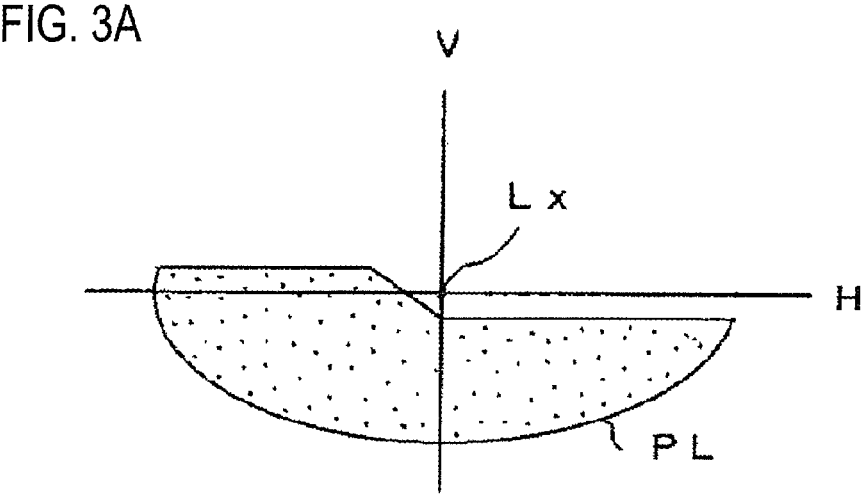
FIGS. 3A and 3B show light distributions that are controlled by the variable shade.
Figure 3B:
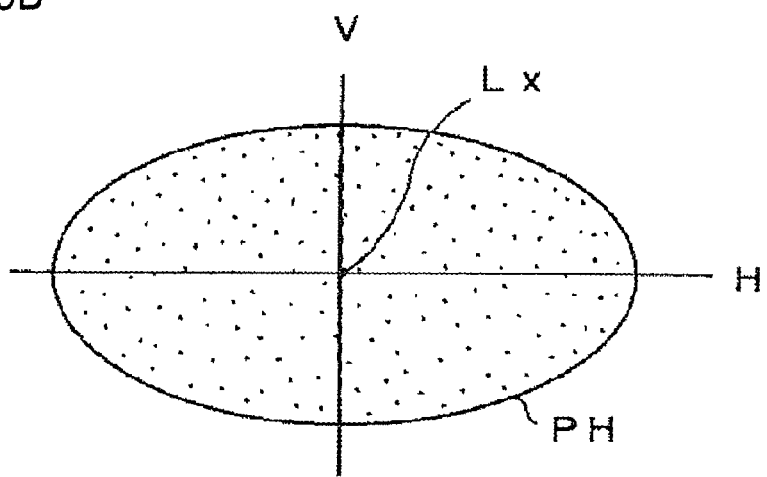

The actuator 6 is driven by a predetermined constant current that is flown therethrough by the lamp control device LC and thus switches the variable shade 5. That is, when the actuator 6 is not energized, the armature 62 is in the state where the leading end portion thereof protrudes from the casing 61 as shown in FIG. 2A and the shade member 52 is rotated forwards by the spring force of the return springs 54 and is in the standing state as shown with the solid line in FIG. 1. In conjunction with this, the connection rod 63 is located in a forward position. Therefore, a part of the light emitted from the LED 2 is shielded by the shade member 52, and the light distribution of the lamp unit LU is the low beam light distribution PL, that is, the first light distribution having the cutoff line following the shape of the upper edge 52a of the shade member 52 as shown in FIG. 3A. On the other hand, when the actuator 6 is energized, the armature 52 is suctioned into the casing 61 and moved in an M direction, and the connection rod 63 is also moved in the M direction. Therefore, the shade member 52 is rotated in an R direction about the tilting shaft 51 against the spring force of the return springs 54 as shown with the dot-dash-line in FIG. 1 and is tilted rearwards. Thereby, the shade member 52 is retreated from a light path of the light emitted from the LED 2 and is thus brought in a tilting state where the shade member 52 does not shield the light. The light distribution of the lamp unit LU is the high beam light distribution PH, that is, the second light distribution as shown in FIG. 3B.

Figure 4:
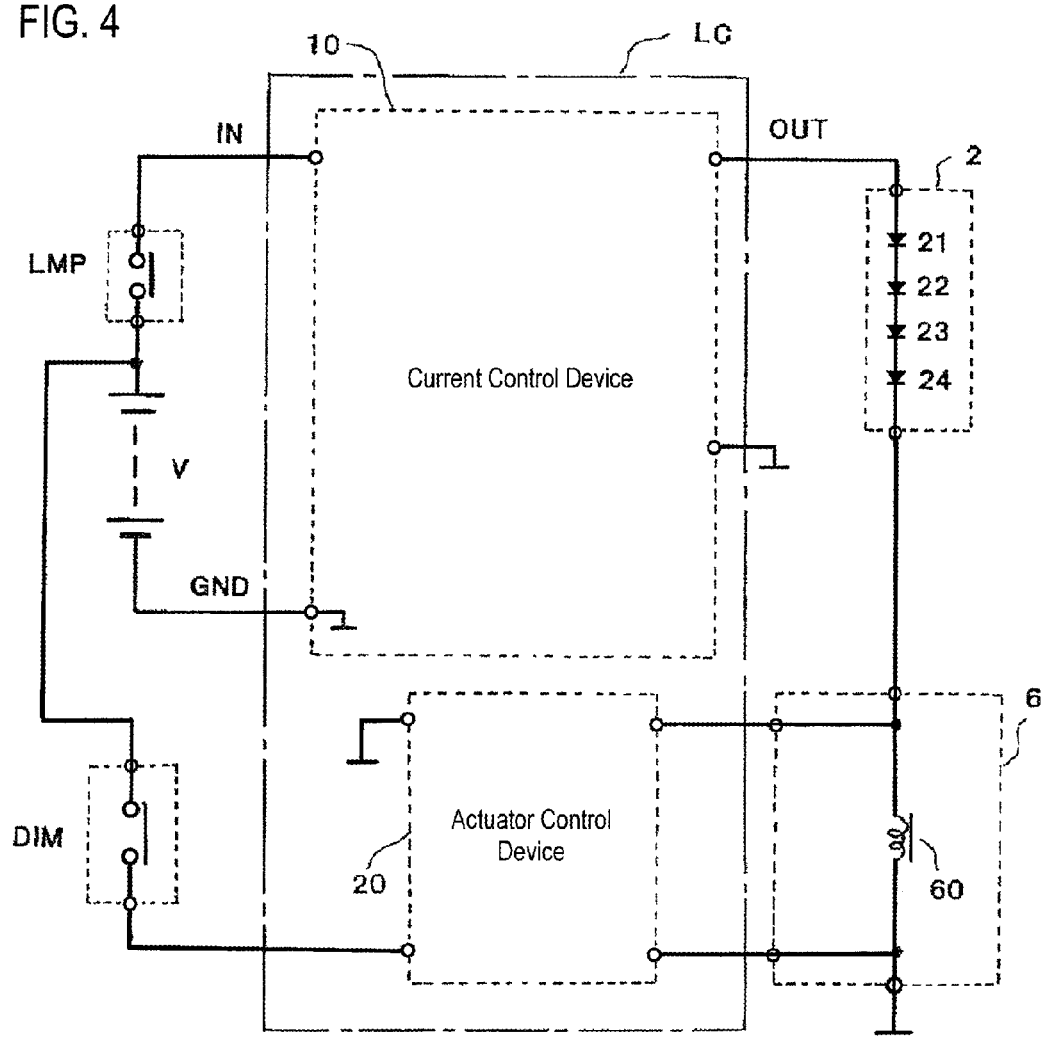
FIG. 4 is a block circuit configuration diagram of a lamp control device.

FIG. 4 is a conceptual configuration view of the lamp control device LC including the lamp switch LMP and the dimmer switch DIM. The lamp control device LC includes a current control device 10 and an actuator control device 20. The LED 2 and the actuator 6 are connected in series to an output terminal OUT of the current control device 10. Also, an input terminal IN of the current control device 10 is connected with the lamp switch LMP. When the lamp switch LMP turns on, a voltage V is input to the input terminal IN, and a predetermined current is output from the output terminal OUT. This output current causes the LED 2 to emit the light. The actuator control device 20 is connected in parallel to the actuator 6. When the dimmer switch DIM is turned off, the actuator control device 20 short-circuits both ends of the actuator 6 (specifically, the solenoid 60; the same will apply hereinafter) to bring the actuator 6 in a non-driving state. When the dimmer switch DIM is turned on, the actuator control device 20 releases the circuit-short state of the actuator 6 to flow the output current through the actuator 6 and to drive the actuator 6.

Embodiment 1

Figure 5:
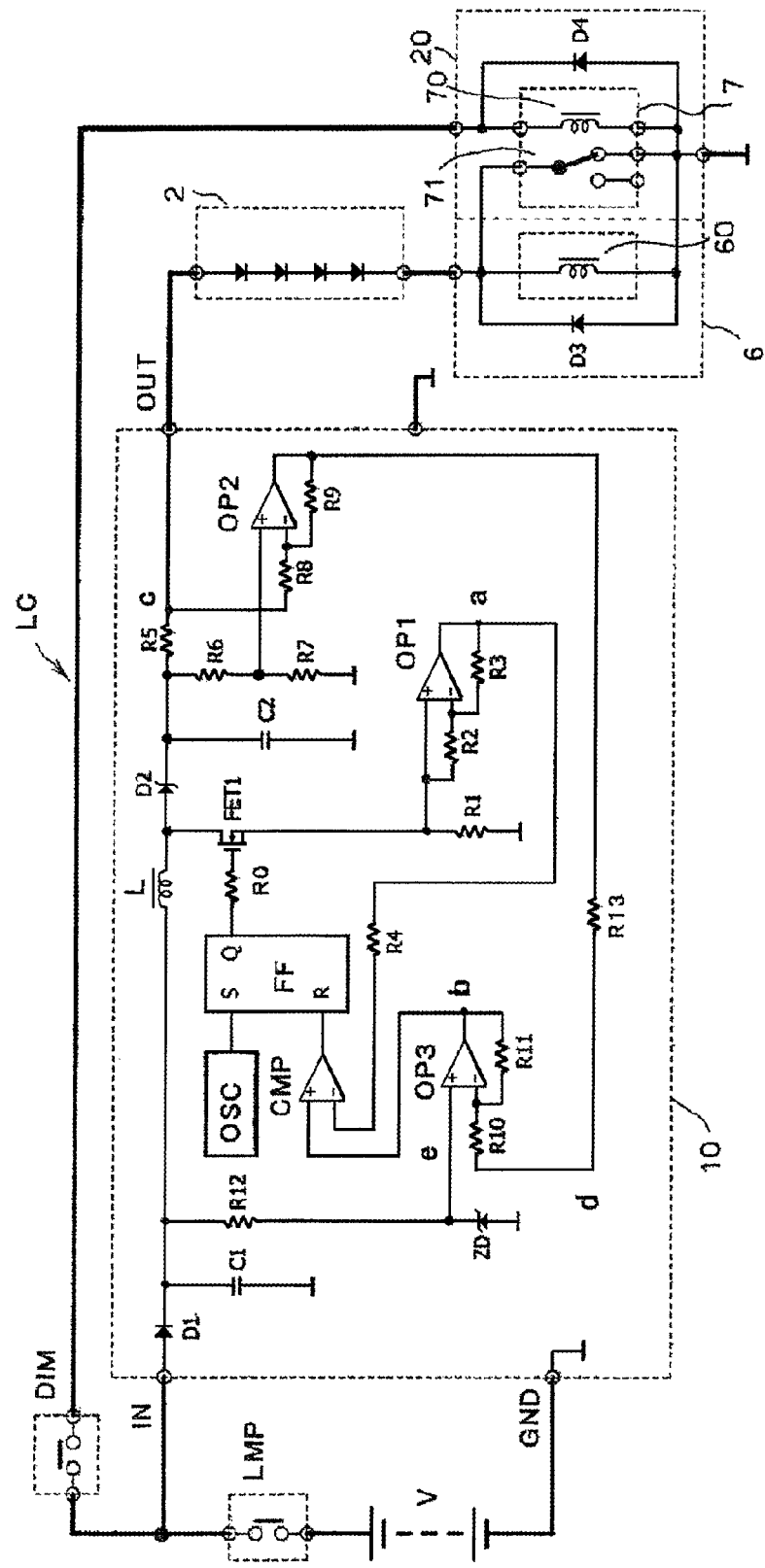
FIG. 5 is a circuit configuration diagram of a lamp control device of an embodiment 1.

FIG. 5 is a circuit configuration diagram of the lamp control device LC of an embodiment 1. In the embodiment 1, the actuator control device 20 is integrated with the actuator 6. In the below descriptions, FET* denotes an electric field effect transistor, C* denotes a capacitor, R* denotes a resistance, D* denotes a diode, and OP* denotes an operational amplifier. The current control device 10 of the lamp control device LC of the embodiment 1 is described with reference to an operation timing chart of FIG. 6. When the lamp switch LMP is turned ON and the voltage V is input to the input terminal IN, an OSC (oscillator) starts to oscillate and a rising edge of the oscillation (S signal) sets an RS-type FF (flip-flop). When the flip-flop FF is set, an FET1 is turned ON, a current flows through an L (inductor) via a shunt resistance R1, and magnetic energy is accumulated in the inductor L. A drop voltage of the shunt resistance R1 is an "a" voltage amplified by an OP1 (inverting amplifier). When the "a" voltage is gradually increased and becomes higher than a comparative voltage ("b" voltage) of a CMP (comparator), an output of the comparator CMP is inverted and the flip-flop FF is reset, so that the FET1 is turned off. As the FET1 is turned off, the electromagnetic energy accumulated in the inductor L charges a capacitor C2 and is output from the output terminal OUT as the output current, which then flows through the LED 2.

As the FET1 is repeatedly turned on and off, a charged amount of the capacitor C2 is increased, so that the current flowing through the LED 2 is increased. When the current is increased, a voltage ("c" voltage) of a shunt resistance R5 is decreased, so that an output voltage "d" of an OP2 (inverting amplifier) is increased. An OP3 (inverting amplifier) inverting-outputs a differential voltage between the "d" voltage and a reference voltage ("e" voltage) generated by a ZD (zener diode). Therefore, when the "d" voltage is increased, the "b" voltage is decreased. Since the comparator CMP compares the "b" voltage with the saw-toothed "a" voltage, the inverting time of the flip-flop FF is short, the ON time of the FET1 is shortened by a gate voltage "Q" of the FET1, and the output current which is output from the output terminal OUT is decreased.

In the meantime, when the ON time of the FET1 is shortened, the magnetic energy which is accumulated in the inductor L is reduced and the charged amount of the capacitor C2 is reduced, so that the "c" voltage of the shunt resistance R5 is increased and the "d" voltage is decreased by the inverting amplifier OP2 contrary to the above. Thereby, the "b" voltage is increased, so that the ON time of the FET1 is lengthened and the output current, which is output from the output terminal OUT, is increased. By the series of operations, even if the voltage V varies, the c voltage of the shunt resistance R5 is controlled to be constant and the output current which is output from the output terminal OUT is feedback-controlled to be the predetermined constant current. The LED 2 emits the light with a stable light intensity by the output current controlled to be the constant current.

The actuator control device 20 includes a main relay switch 7 that performs a switching operation as an ON signal (voltage V), which is input when the dimmer switch DIM is turned ON, is applied to a relay coil 70. A normally closed contact 71 of the main relay switch 7 is connected in parallel to the actuator 6. That is, when the dimmer switch DIM is OFF, the actuator 6 is short-circuited by the normally closed contact 71 of the main relay switch 7 and is in the non-operating state. When the dimmer switch DIM is turned ON, the normally closed contact 71 of the main relay switch 7 is opened by excitation of the relay coil 70, the output current of the current control device 10 flowing through the LED 2 flows through the actuator 6, and the actuator 6 is brought in a driving state.

Therefore, as described above, when the dimmer switch is OFF while the lamp switch LMP is turned ON and the LED 2 emits the light by the output current from the output terminal OUT of the current control device 10, that is, when the first light distribution is set, the output current of the current control device 10 does not flow through the actuator 6 because the solenoid 60 of the actuator 6 is short-circuited by the normally closed contact 71 of the main relay switch 7. Therefore, the actuator 6 is kept in the initial state shown in FIG. 2A, the variable shade 5 is controlled to be located in the position for the low beam light distribution, a part of the light emitted from the LED 2 is shielded by the variable shade 5, and the light is illuminated in the form of the low beam light distribution PL as shown in FIG. 3A.

Figure 2B:
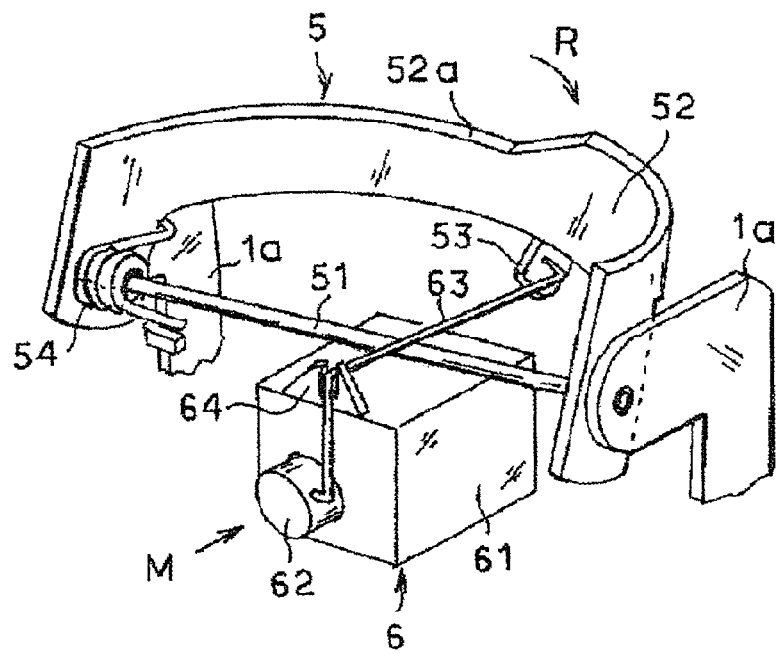
Figure 6:
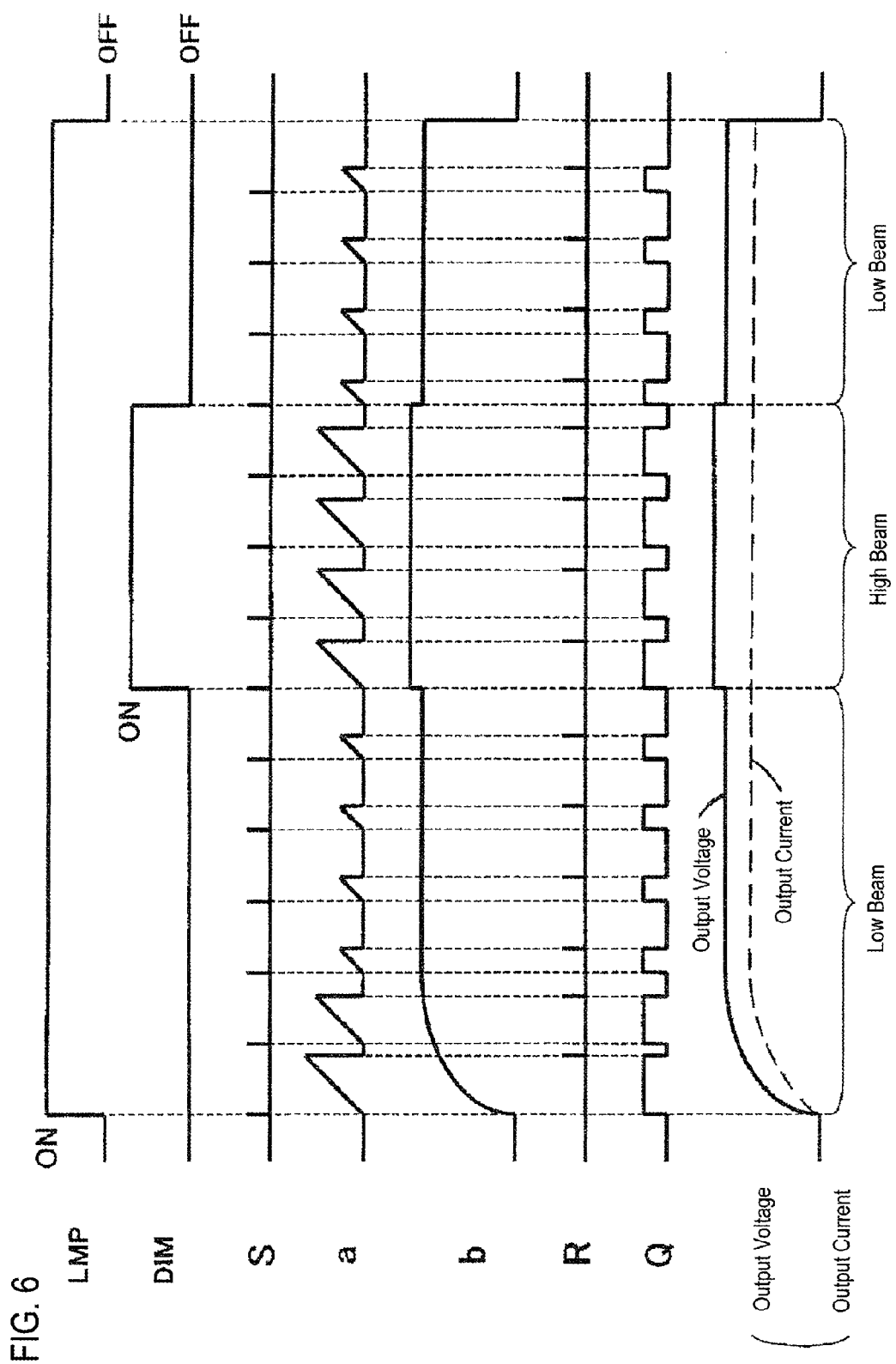
FIG. 6 is an operation timing chart of a current control device of the embodiment 1.

When the dimmer switch DIM is turned ON and the second light distribution is thus set, the normally closed contact 71 of the main relay switch 7 is opened, and the short-circuited state of the actuator 6 is released. Thus, the output current from the output terminal OUT of the current control device 10 flows through the actuator 6 via the LED 2. Thereby, the LED 2 keeps emitting the light, the actuator 6 is driven, the variable shade 5 is retreated from the light path as shown in FIG. 2B, and the light emitted from the LED 2 is illuminated without being shielded by the variable shade 5. As a result, the light is illuminated in the form of the high beam light distribution PH as shown in FIG. 3B. At this time, the current control device 10 performs such control that the output current of the constant current is output from the output terminal OUT. Therefore, when the actuator 6 is connected in series with the LED 2, the output voltage is increased as shown in FIG. 6, so that the output current is controlled to the constant current. Thereby, the LED 2 emits the light at a predetermined light intensity by the constant current, and the actuator 6 is securely driven by the constant current.

In the embodiment 1, even if Vf is varied due to individual difference in LEDs or the like, the output current from the current control device 10, which is controlled to the constant current, flows through the LED 2 and also flows through the actuator 6. Therefore, it is possible to securely drive the actuator 6 without being influenced by the variation in Vf of the LED 2. Thereby, it is not necessary to secure a margin, which is required to deal with the variation of Vf, in the output current of the current control device 10. Also, since it is possible to design the current control device 10 with the minimum necessary power consumption, it is possible to save the power and to achieve the improvement as described above.

Also, in the embodiment 1, the actuator control device 20 including the main relay switch 7 is configured separately from the current control device 10 as described above. Therefore, a lamp having the actuator 6 may be provided with the actuator 6, the actuator control device 20, and the current control device 10. Also, a lamp having no actuator may be provided with only the current control device 10. That is, any lamp may be provided with the current control device 10 having the same configuration, irrespective of whether or not the actuator is provided. Therefore, such an advantage can be achieved that the current control device 10 is made compatible with those lamps. Furthermore, in the embodiment 1, the actuator control device 20 is integrated with the actuator 6 to be unitized with the actuator 6. Thus, in a lamp having an actuator, when the actuator 6 is provided to the lamp separately from the current control device 10, the actuator control device 20 is also incorporated into the lamp, and it is advantageous to simplify an assembling operation of the lamp.

In the solenoid-type actuator, it has been known that a holding current for holding the driven state after the actuator is driven may be smaller than a starting current that is necessary when driving of the actuator is started. Therefore, in the embodiment 1, the holding current that flows after the actuator 6 is driven and the variable shade 5 is thus switched is suppressed to be smaller than the starting current. Thereby, it is possible to reduce the power consumption in the actuator 6. For example, the current flowing through the actuator 6 may be reduced by a device that operates when a predetermined time, which is necessary to turn on the dimmer switch DIM to start the actuator 6 and to switch the variable shade 5, has elapsed.

Embodiment 1-1

Figure 7:
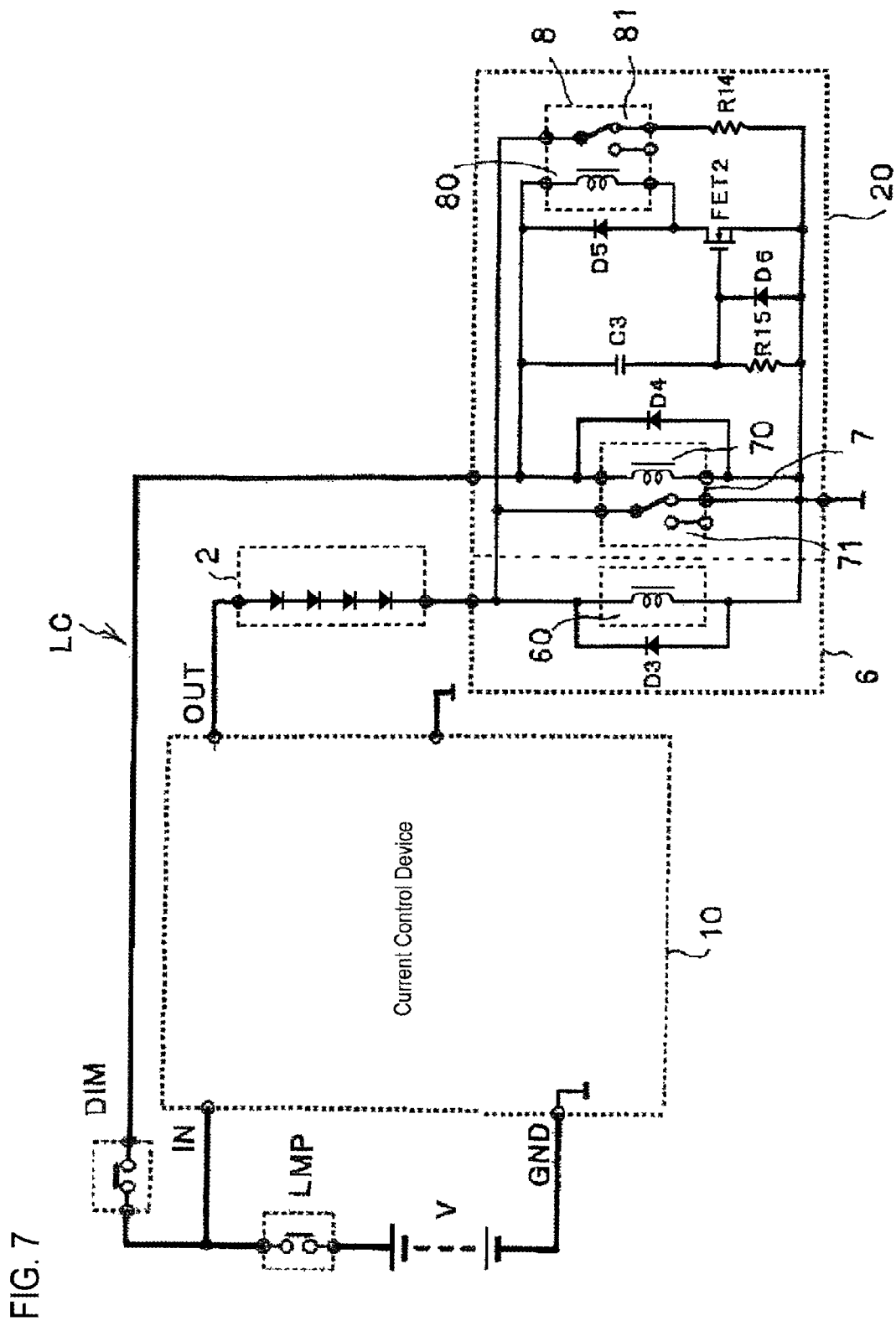
FIG. 7 is a circuit configuration diagram of a lamp control device of an embodiment 1-1.

FIG. 7 is a circuit diagram of an embodiment 1-1 which is a modification example 1 of the embodiment 1. In the embodiment 1-1, a current reducing unit is provided that can suppress the holding current. Here, in the actuator control device 20, a suppression resistance R14 and a sub relay switch 8 are connected in series. The suppression resistance R14 and the sub relay switch 8 are also connected in parallel to the actuator 6. The suppression resistance R14 is connected to a normally closed contact 81 of the sub relay switch 8. Also, a FET2 having a bias circuit including a diode D5, a diode D6, a capacitor C3 and a resistance R15 is connected to a relay coil 80 of the sub relay switch 8. ON and OFF operations of the FET2 control the current flowing through the relay coil 80 of the sub relay switch 8.

With the configuration of the embodiment 1-1, when the dimmer switch DIM is turned ON, the output current is caused to flow through the actuator 6 by the main relay switch 7 as described above. At the same time, the FET2 is turned ON because the output current of the current control device 10 flows through the capacitor C3 and the resistance R15. Thereby, the current flows through the relay coil 80 of the sub relay switch 8, so that the normally closed contact 81 is switched to the opened side, the suppression resistance R14 is not connected in parallel to the actuator 6, and the output current of the current control device 10 flows through the actuator 6 as a starting current. After the dimmer switch DIM is turned ON, when a predetermined time, that is, the time that is necessary to switch the variable shade 5 has elapsed, the capacitor C3 becomes a predetermined potential because the output current of the current control device 10 charges the capacitor C3. Therefore, the FET2 is turned OFF, the current flowing through the relay coil 80 of the sub relay switch 8 is interrupted, and the normally closed contact 81 is returned to the normally closed side. Hence, the suppression resistance R14 is connected in parallel to the actuator 6, and the output current of the current control device 10 flowing through the actuator 6 is reduced by an amount of the current flowing through the suppression resistance R14. The reduced current is a current corresponding to the holding current and holds the switched state of the variable shade 5 by the actuator 6 and the power consumption of the actuator 6 is suppressed at the holding state.

Embodiment 1-2

Figure 8:
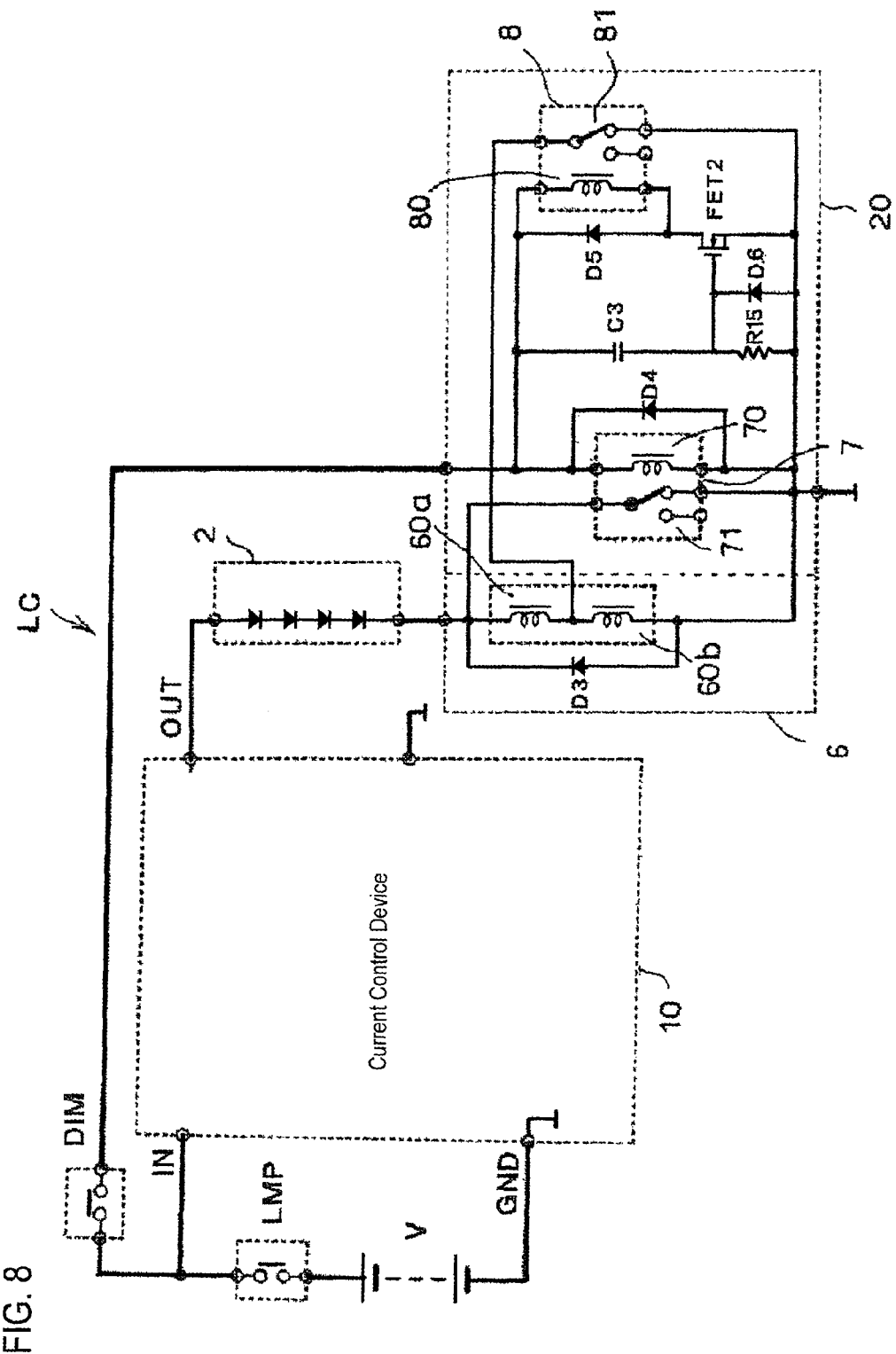
FIG. 8 is a circuit configuration diagram of a lamp control device of an embodiment 1-2.

FIG. 8 is a circuit diagram of an embodiment 1-2 which is a modification example 2 of the embodiment 1. Parts equivalent to those of the embodiment 1 are given the same reference numerals. Here, the solenoid 60 of the actuator 6 includes a first solenoid 60a and a second solenoid 60b. An intermediate tap is provided at a connection point between the first and second solenoids 60a, 60b. The normally closed contact 81 of the sub relay switch 8 is connected to the intermediate tap. The first solenoid 60a and the second solenoid 60b are connected in series. When the output current flows through both of the solenoids 60a, 60b, the actuator 6 exhibits a driving force that can switch the variable shade 5. When the output current flows through the first solenoid 60a only, the driving force is decreased but the actuator 6 exhibits a holding force for holding the switched state of the variable shade 5.

According to the embodiment 1-2, when the dimmer switch DIM is turned ON, the output current of the current control device 10 flows through the capacitor C and the resistance R15, so that the FET2 is turned ON and the normally closed contact 81 of the sub relay switch 8 is switched to the opened side. Therefore, the first solenoid 60a and the second solenoid 60b of the actuator 6 are connected in series. Thereby, the output current of the current control device 10 flows through both the solenoids 60a, 60b, and the actuator 6 exhibits the predetermined driving force to thus switch the variable shade 5. When the time for which the variable shade 5 is switched after the dimmer switch DIM is turned ON has elapsed, since the capacitor C3 is charged, the FET2 is turned OFF and the normally closed contact 81 of the sub relay switch 8 is returned to the normally closed side. Therefore, the second solenoid 60b is short-circuited via the intermediate tap, and the output current flows through only the first solenoid 60a of the actuator 6. Thereby, the driving force of the actuator 6 is reduced to the driving force that is necessary to hold the switched state of the variable shade 5, and the power consumption of the actuator 6 in the holding state is suppressed.

Embodiment 1-3

In the embodiments 1-1 and 1-2, the driving force, of the actuator 6, for holding the switched state of the variable shade 5 is reduced to suppress the power consumption. However, in order to secure the switching operation of the variable shade 5, it is necessary to use an actuator that can exhibit the driving force, which is required for the switching operation, by the constant current. Meanwhile, even if an overcurrent flows through the solenoid-type actuator 6, which is used here, for a short time period, the actuator 6 can increase its driving force without being damaged so long as the overcurrent is in a predetermined range. Then, in an embodiment 1-3 that is a further modification example of the embodiment 1, an actuator is employed that is smaller in size and is of a smaller specified current than those of the embodiments 1-1 and 1-2, and a current increasing unit is provided. Only at a time when the variable shade 5 is switched, that is, only at a starting initial stage of the actuator 6, the current increasing unit causes a current that is larger than the constant current to flow through the actuator 6 so as to increase the driving force and secure the switching operation. Also, after the variable shade 5 is switched, the current increasing unit causes the constant current to flow though the actuator 6 so as to hold the switched state.

Figure 9:
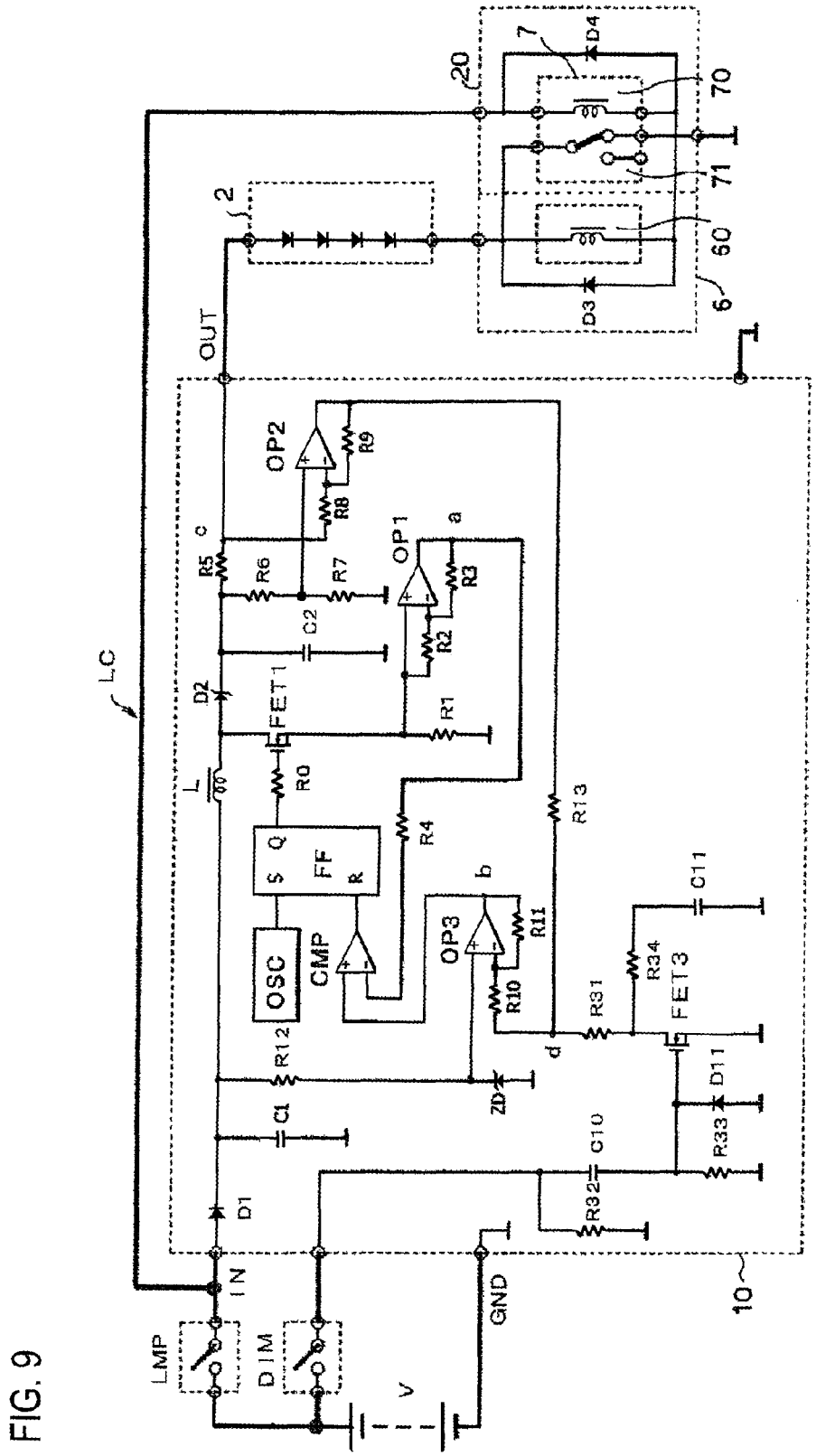
FIG. 9 is a circuit configuration diagram of a lamp control device of an embodiment 1-3.
Figure 10:
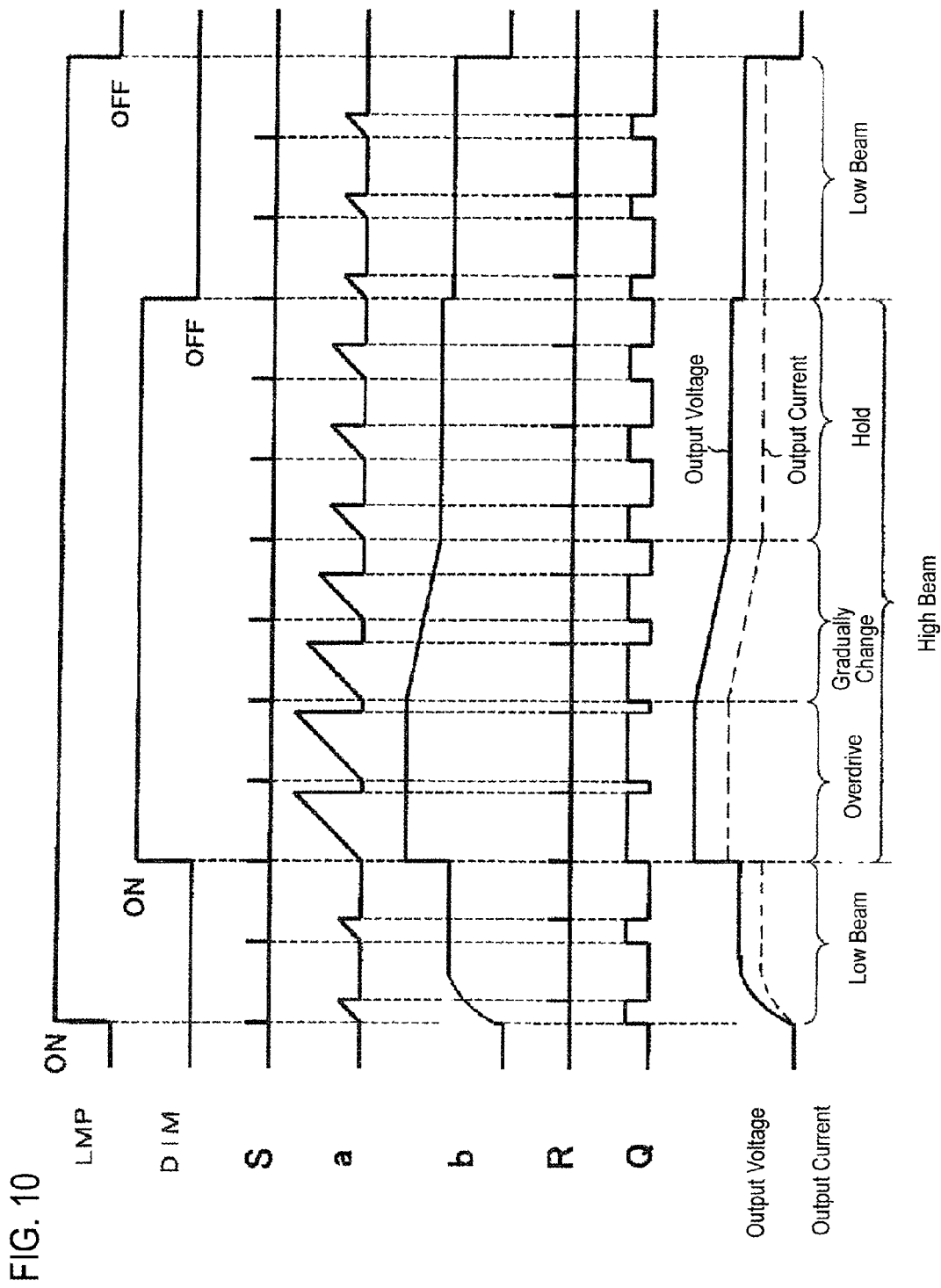
FIG. 10 is an operation timing chart of a current control device of the embodiment 1-3.

FIG. 9 is a circuit diagram of the lamp control device LC of the embodiment 1-3 including the current increasing unit. The current increasing unit includes a FET3, capacitors C10, C11, resistances R31 to 34 and a diode D11. Here, the actuator 6 is such that the maximum driving force, which is obtained when the specified current flows therethrough, is smaller than those of the embodiments 1-1 and 1-2 as described above. That is, the actuator 6 is smaller one than those of the embodiments 1-1 and 1-2. Referring to a timing chart of FIG. 10, when the dimmer switch is turned OFF, the constant current flows through the LED 2 as in the embodiments 1, 1-1, and 1-2. When the dimmer switch DIM is turned ON, the current flows through the capacitor C10 and the resistance R33. The FET3 is turned ON until charging of the capacitor C10 is finished. The "d" voltage is dropped by a voltage drop of the resistance R31. Thus, the "b" voltage of the output of the inverting amplifier OP3 is increased. The set time of the flip-flop FF, that is, the ON time of the FET1 gets longer, so that the electric accumulation in the inductor L provides a current larger than the steady current. Therefore, the actuator 6 can obtain a larger driving force by the large current than that when the constant current flows. The actuator 6 drives the variable shade 5 by the increased driving force to switch the variable shade 5 to the high beam light distribution.

If the setting time elapses at a timing at which the switching of the variable shade 5 is completed, the capacitor C10 is charged, the FET3 is turned OFF, the "d" voltage returns to a normal voltage, and the "b" voltage is decreased. Thus, the set time of the flip-flop FF is shortened so that the ON time of the FET1 is also shortened, the electric accumulation of the inductor L is decreased, the charged voltage of the capacitor C2 is decreased, and the constant current flows through the LED 2 and the actuator 6. Therefore, the actuator 6 exhibits the specified driving force and holds the switched state of the variable shade 5.

In the embodiment 1-3, the larger current than the constant current flows through the actuator 6 upon the switching to the high beam light distribution. Therefore, it is possible to increase the driving force at a time of the starting of the actuator 6 so as to rapidly move the armature 62 and promptly perform the switching from the low beam light distribution to the high beam light distribution. After the variable shade 5 is switched, the constant current flows. At this point in time, the driving force of the actuator 6 is required. Therefore, the state of the high beam light distribution can be maintained. Hence, even if the actuator of the small specified current is used as the actuator 6, it is possible to perform the switching operation of the variable shade 5 and to hold the switched state of the variable shade 5. Also, since the small actuator can be employed, it is possible to achieve the compact lamp unit. Also, even if the large current flows through the actuator 6 during the switching of the variable shade 5, this flowing time period is short and the constant current is immediately flows. Thus, it is possible to save the power in the actuator 6 and to suppress heat generation in the actuator 6.

Embodiment 2

Figure 11:
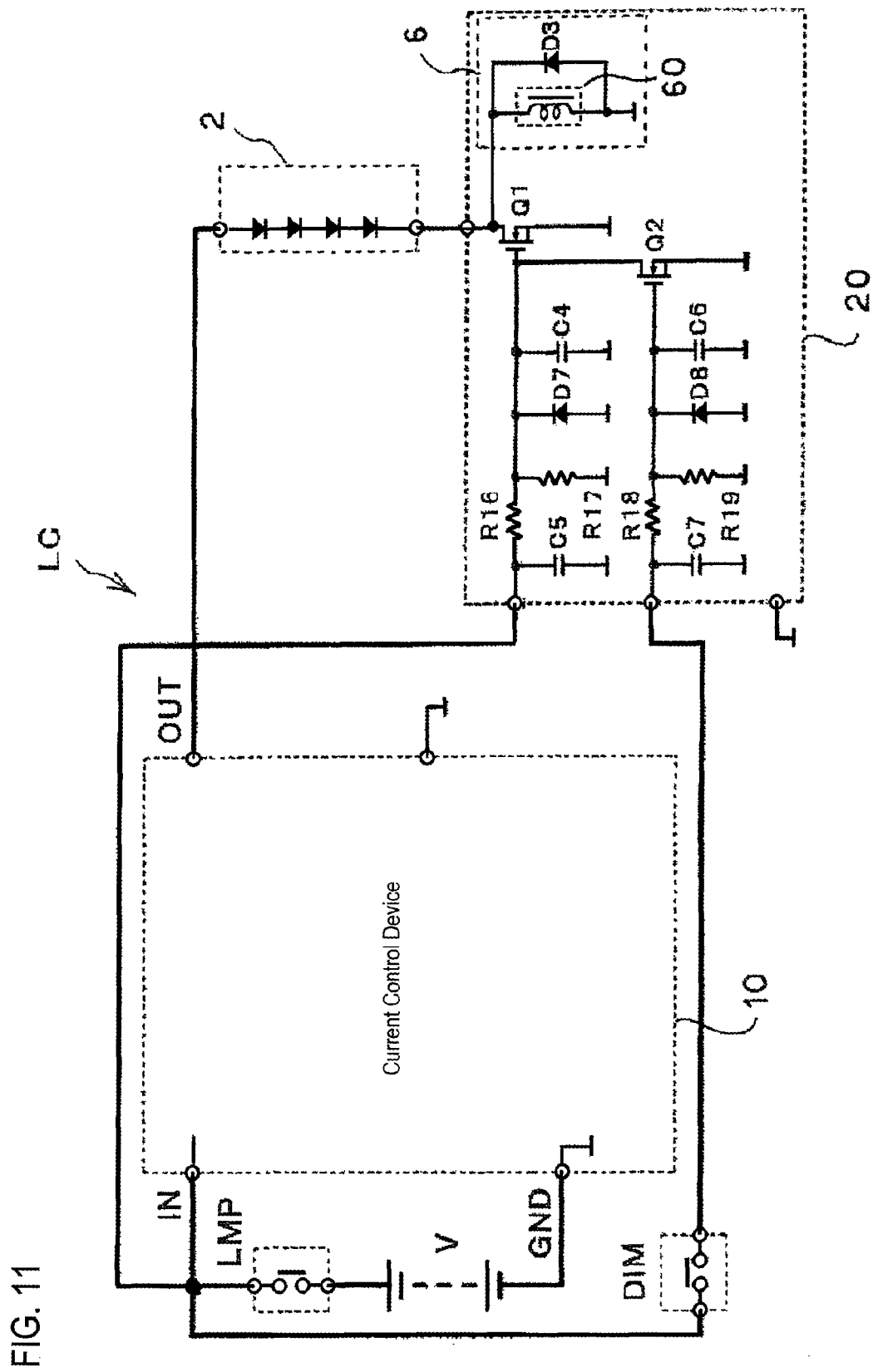
FIG. 11 is a circuit configuration diagram of a lamp control device of an embodiment 2.

FIG. 11 is a circuit diagram of a lamp control device LC according to an embodiment 2. Here, the actuator control device 20 includes a switching device circuit having a switching FET, in place of the relay switch 7 of the embodiment 1. Also, in the embodiment 2, the actuator control device 20 is integrated with the actuator 6 to be unitized or modularized with the actuator 6. The actuator control device 6 includes a switching element Q1 and a switching element Q2. The switching element Q1 is formed of a FET including a bias circuit having capacitors C4, C5, resistances R16, R17, and a diode D7. The switching element Q2 is formed of a FET including a bias circuit having capacitors C6, C7, resistances R18, R19, and a diode D8. A source and a drain of the switching element Q1 are connected in parallel to the actuator 6. A source and a drain of the switching element Q2 are connected in parallel to a gate and the drain of the switching element Q1.

According to the embodiment 2, when the lamp switch LMP is turned ON, the output current of the current control device 10 flows through the LED 2, so that the LED 2 emits the light. At this time, since the dimmer switch DIM is OFF, the switching element Q2 is OFF. Therefore, when the lamp switch LMP is turned ON, the switching element Q1 is turned ON and the actuator 6 is short-circuited by the switching element Q1. Thus, the output current of the current control device 10 flows through only the LED 2 and does not flow through the actuator 6. Since the actuator 6 is not driven, the low beam light distribution is formed. When the dimmer switch DIM is turned ON in this state, the switching element Q2 is turned ON, so that the switching element Q1 is switched to the OFF state. Therefore, the shorted state is released, the output current of the current control device 10 flows through the actuator 6 via the LED 2, the actuator 6 is driven, and the variable shade 5 is switched to form the high beam light distribution.

In the embodiment 2, since the relay switch is not required, it is possible to make the actuator control device 20 smaller in size and to achieve low power consumption. In particular, the constitutional components are only the electronic components such as the resistance, the capacitor, the diode, the FET and the like. Therefore, when the actuator control device 20 integrated with the actuator 6 to be unitized or modularized with the actuator 6, the miniaturization effect is improved, which facilitates to mount the actuator control device 20 and the actuator 6 to the lamp and results in achieving the small-size lamp. Also, in the embodiment 2, even if variability of Vf occurs due to individual difference in LEDs, the predetermined constant current flows through the actuator 6. Therefore, it is not necessary to secure a margin, which deals with the variation of Vf, in the output current of the current control device 10. Also, since it is possible to design the current control device 10 with the minimum necessary power consumption, it is possible to save the power.

In the embodiment 2, in a lamp having an actuator, the current control device 10 may be mounted to the lamp after the actuator 6 integrated with the actuator control device 20 is mounted to the lamp. Also, in a lamp having no actuator, only the current control device 10 may be mounted to the lamp. Since the current control device 10 having the same confirmation can be mounted on any lamp, it is possible to make the current control device 10 compatible with these lamps.

In the embodiment 2, although not specifically described, a circuit as shown in FIG. 7 of the embodiment 1 may be provided. In this circuit, a suppression resistance is connected in parallel to the actuator 6, and a switching element such as FET 2 which is turned ON/OFF in response to the timer operation so as to switch the connection state of the suppression resistance. Alternatively, a circuit as shown in FIG. 8 of the embodiment may be provided. In this circuit, the actuator 6 includes a first solenoid and a second solenoid, and a switching element such as FET 2 which is turned ON/OFF in response to the timer operation so as to switch the connection state of the solenoid. With this configuration, it is possible to reduce the holding current of the actuator 6 to be smaller than the starting current, to thereby save the power.

Embodiment 2-1

Figure 12:
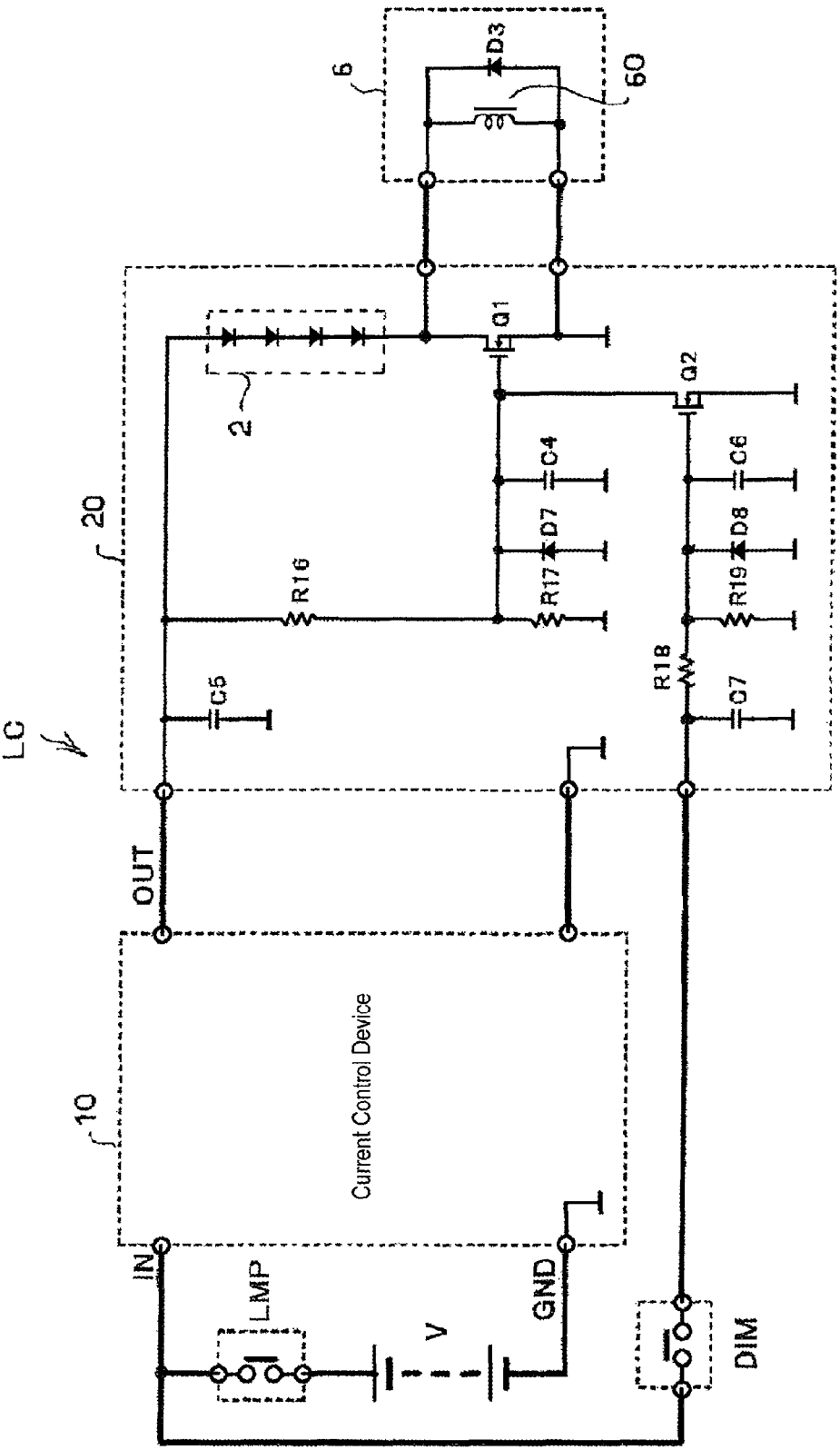
FIG. 12 is a circuit configuration diagram of a lamp control device of an embodiment 2-1.

In the above embodiments, the actuator control device 20 is unitized or modularized with the actuator 6. In the embodiment 2, the actuator control device 20 is formed of only the electronic device components such as the resistance, the capacitor, the semiconductor device and the like. Therefore, the actuator control device 20 can also be unitized or modularized with the LED 2 or the current control device 10. For example, FIG. 12 is a circuit diagram of an embodiment 2-1 that is a modification example 1 of the embodiment 2 and shows a circuit in which the actuator control device 20 is unitized with the LED 2. Here, a bias circuit for each of the switching elements Q1, Q2 has a configuration that is partially modified as compared to that of FIG. 11. However, the same parts are given the same reference numerals. Also, the substantive configurations and operations of the bias circuits are the same as those of the bias circuits shown in FIG. 11. Specifically, when the dimmer switch DIM is OFF, the switching element Q1 is in an ON state, and the actuator 6 is short-circuited and is thus in the non-driving state. When the dimmer switch DIM is turned ON, the switching element Q1 is turned OFF, so that the shorted state of the actuator 6 is released and the actuator 6 is thus driven to switch the variable shade 5.

In the embodiment 2-1, the actuator 6 is driven by the constant current of the current control device 10. Therefore, like the embodiments described above, it is possible to solve the margin for the output current, which is required due to the variation of Vf in LEDs, to achieve low power consumption and also to achieve the improvement described above. Also, the actuator control device 10 having the LED 2 unitized thereto may be connected with the actuator 6 with a pair of harnesses. Therefore, the number of harnesses for connecting the current control device 10, the actuator control device 20 and the LED 2 is smaller than that in the embodiment 1.

Embodiment 2-2

Figure 13:
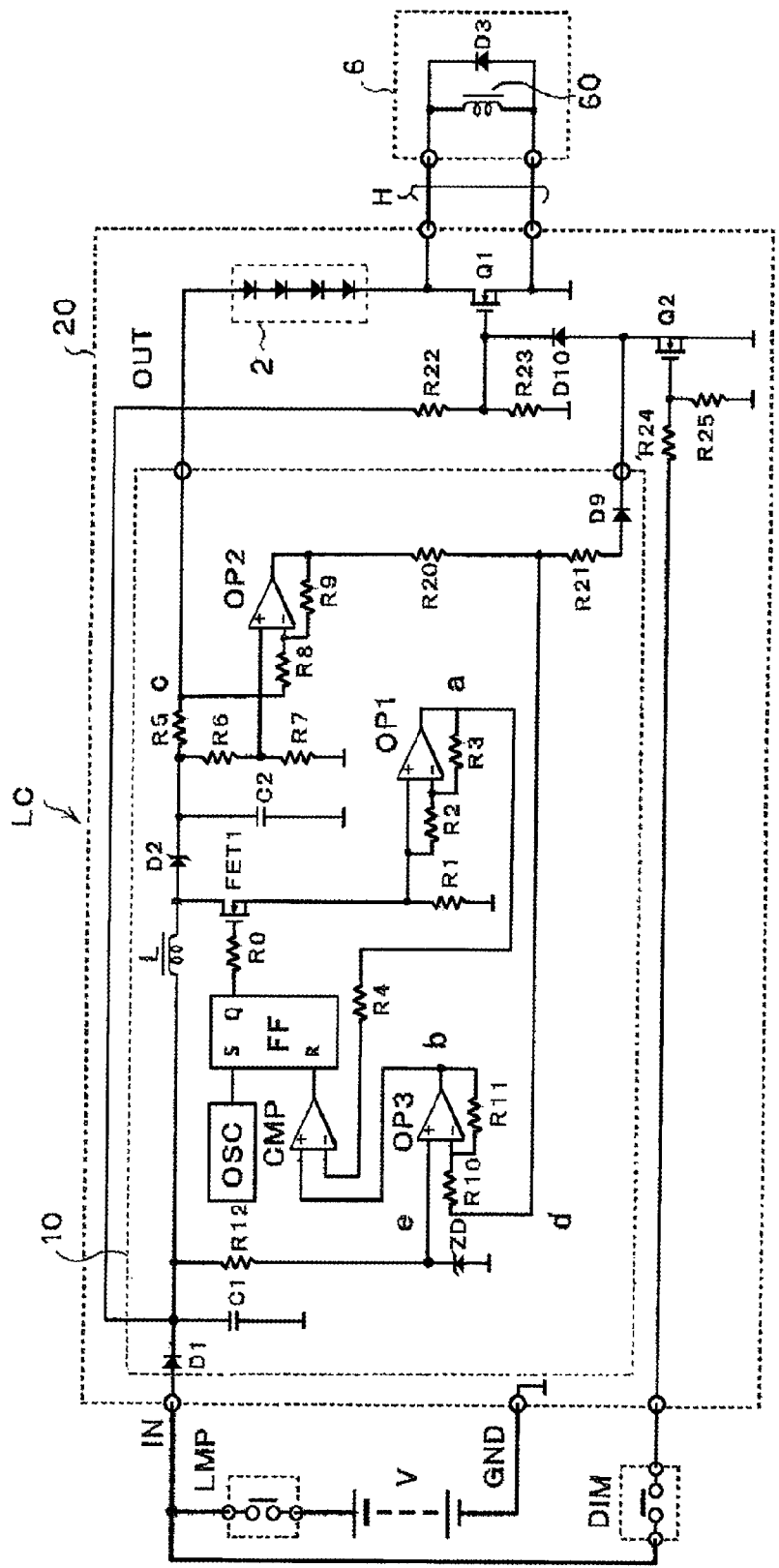
FIG. 13 is a circuit configuration diagram of a lamp control device of an embodiment 2-2.

Alternatively, the actuator control device of the embodiment 2 may be also unitized or modularized with the current control device. FIG. 13 is a circuit diagram of an embodiment 2-2 that is a modification example 2 of the embodiment 2. In the embodiment 2-2, the actuator control device 20 is unitized with the current control device 10 and the LED 2. Also, in the embodiment 2-2, the bias circuits for the switching elements Q1, Q2 include resistances R21, R22, R23, R24, R25 and diodes D9, D10 and have the configurations that are partially modified as compared to those shown in FIG. 11. However, the substantive configurations and operations of the bias circuits are the same as those shown in FIG. 11. Thus, when the dimmer switch DIM is OFF, the switching element Q1 is in an ON state, and the actuator 6 is short-circuited and is thus in the non-driving state. When the dimmer switch DIM is turned ON, the switching element Q1 is turned OFF, so that the shorted state of the actuator 6 is released, and the actuator 6 is thus driven to switch the variable shade 5.

In the embodiment 2-2, it is possible to solve the margin of the output current, which is required due to the variation of Vf in LEDs, and to achieve low power consumption. Also, it is only required to connect the actuator control device 20, with which the LED 2 and the current control device 10 and the actuator 6 are unitized, with a pair of harnesses H. Therefore, it is possible to advantageously reduce the number of the harnesses for connecting the current control device 10, the actuator control device 20, and the LED 2, like the embodiments 1 and 2. Particularly, in this configuration, even if the harness H connecting to the actuator 6 is disconnected, the LED 2 keeps emitting the light and the actuator 6 is returned to the initial state to thus return the variable shade 5 to the low beam light distribution. Therefore, the variable shade 5 is avoided from being fixed to the high beam light distribution which may cause glare to a driver of another vehicle, which is advantageous in terms of fail safe. Also, since the actuator control device 20 is unitized with the current control device 10 and the LED 2, a lamp having an LED as a light source is mounted with not only the LED 2 but also the current control device 10 and the actuator control device 20.

Embodiment 3

In the above embodiments 1 and 2, the actuator 6 is connected in series with the LED 2, and the light distribution state is switched between (i) the low beam light distribution state where the actuator 6 is short-circuited and the constant current flows through only the LED 2 and (ii) the high beam light distribution state where the shorted state is released and the constant current flows through the LED 2 and the actuator 6.

Figure 14:
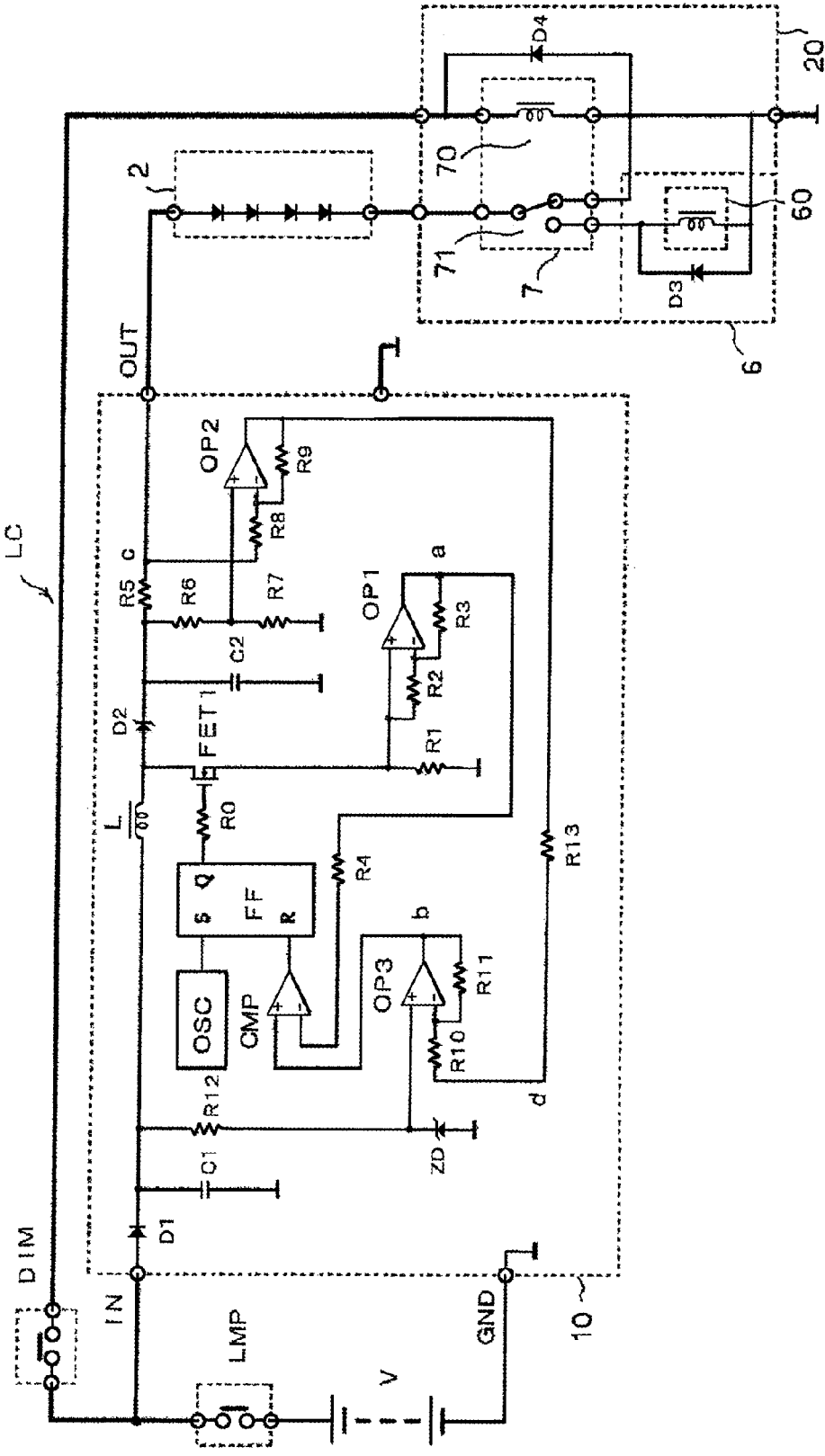
FIG. 14 is a circuit configuration diagram of a lamp control device of an embodiment 3.

In an embodiment 3, as shown in FIG. 14, a so-called transfer contact switches between a state where the actuator 6 is connected to the LED 2 and a state where the actuator is not connected to the LED 2. Here, the relay contact 71 and the actuator 6 are connected in series with the LED 2. However, in the relay contact 71, the normally closed contact is grounded while the normally opened contact is connected to the actuator 6. Therefore, when the dimmer switch DIM is OFF, the relay contact 71 is grounded, so that the current flows only through the LED 2. On the other hand, when the dimmer switch DIM is turned ON, the relay contact 71 is switched to the actuator 6 and the current flows through the LED 2 and actuator 6.

In the embodiment 3, the state where the constant current flows through the LED 2 and the state where the current flows through the LED 2 and actuator 6 can be switched to each other, like the embodiments 1 and 2. Therefore, it is possible to save the power upon the driving of the actuator 6. Also, in the embodiment 3, the current reducing unit or the current increasing unit may be provided. Meanwhile, in the embodiment 3, the current flowing through the LED 2 is temporally interrupted upon the switching of the light distribution. However, since the switching at the relay contact 71 is instantaneous, the light out of the LED 2 is also temporal, which is not problematic as regards the lamp illumination.

The actuator control device of the invention is not limited to those described in the embodiments 1, 2 and 3 so long as it has a function of controlling the current, which flows through the actuator in response to manipulation of the dimmer switch, without hindering the output current of the current control device from flowing through the LED.

In the embodiments, the LED is configured by having a plurality of LEDs or a plurality of LED chips integrated. However, the LED serving as the light source may be configured of a single LED. Also, the plurality of LEDs may be connected in series or in parallel. Furthermore, the light source may be a semiconductor light emitting device other than the LED, for example, an electric bulb such as incandescent light bulb.

The actuator of the invention is not limited to one for driving the variable shade to switch between the low beam light distribution and the high beam light distribution. The actuator of the invention may drive the variable shade that is driven when the light distribution is switched from one light distribution to another light distribution. Also, the actuator of the invention is not limited to one for driving the variable shade as described in the above embodiments. The actuator of the invention may be one for switching the light distribution of the lamp, for example, one for moving a position of the light source in the lamp unit, one for tilting a reflector in an up and down direction and/or in a right and left direction, or one for moving an optical member for changing the light distribution.

The invention can be applied to a vehicle lamp having a solenoid-type actuator that switches a light distribution of light emitted from a light source.

What is claimed is:

1. A vehicle lamp comprising:
   a light source that lights up when a current flows therethrough;
   a solenoid-type actuator that controls a light distribution of light that is illuminated from the light source; and
   a lamp control device that controls lighting-up of the light source and driving of the actuator, wherein
   the lamp control device includes:
   a current control device that outputs a constant current, and
   an actuator control device that connects the actuator to the light source in series when the actuator is activated by a predetermined signal so that the constant current, which is output from the current control device, flows through the light source and the actuator.

2. The vehicle lamp according to claim 1, wherein the actuator control device includes a relay switch that switches between a state where only the light source is connected to the current control device and a state where the light source and the actuator are connected to the current control device in series when the predetermined signal is input.

3. The vehicle lamp according to claim 1, wherein the actuator control device includes a switching circuit that, when the predetermined signal is input, switches the actuator to a state where the actuator is connected to the light source in series.

4. The vehicle lamp according to claim 1, further comprising:
   a current reducing unit that reduces the current flowing through the actuator after a predetermined time elapses since the constant current starts to flow through the actuator.

5. The vehicle lamp according to claim 1, further comprising:
   a current increasing unit that increases the current flowing through the actuator at a starting initial stage at which the constant current flows through the actuator.

6. The vehicle lamp according to claim 1, wherein the actuator control device is provided independently of at least the current control device and the light source.

7. The vehicle lamp according to claim 6, wherein the actuator control device is integrated with the actuator.

8. The vehicle lamp according to claim 1, wherein the actuator control device is integrated with at least one of the current control device and the light source.

9. The vehicle lamp according to claim 1, wherein the actuator controls the vehicle lamp so that a low beam light distribution is formed when the current does not flow through the actuator and controls the vehicle lamp so that a high beam light distribution is formed when the current flows through the actuator.

10. The vehicle lamp according to claim 1, wherein the actuator control device is connected in parallel to the actuator and configured to release a short-circuited state of the actuator, so that the actuator is connected to the light source in series.

* * * * *